United States Patent
Wang et al.

(10) Patent No.: US 9,602,498 B2
(45) Date of Patent: Mar. 21, 2017

(54) INLINE INSPECTION OF SECURITY PROTOCOLS

(71) Applicant: Fortinet, Inc., Sunnyvale, CA (US)

(72) Inventors: Wei David Wang, North Vancouver (CA); Junfeng Jia, Burnaby (CA); Hongbin Lu, San Jose, CA (US)

(73) Assignee: Fortinet, Inc., Sunnyvale, CA (US)

( * ) Notice: Subject to any disclaimer, the term of this patent is extended or adjusted under 35 U.S.C. 154(b) by 662 days.

(21) Appl. No.: 14/056,870

(22) Filed: Oct. 17, 2013

(65) Prior Publication Data

US 2015/0113264 A1    Apr. 23, 2015

(51) Int. Cl.
*H04L 29/06*    (2006.01)

(52) U.S. Cl.
CPC .......... *H04L 63/0823* (2013.01); *H04L 63/02* (2013.01); *H04L 63/0464* (2013.01); *H04L 63/166* (2013.01)

(58) Field of Classification Search
CPC  H04L 63/166; H04L 63/0464; H04L 63/0823
See application file for complete search history.

(56) References Cited

U.S. PATENT DOCUMENTS

| | | | | |
|---|---|---|---|---|
| 7,506,368 | B1* | 3/2009 | Kersey | H04L 63/0428 726/12 |
| 8,312,308 | B2* | 11/2012 | Kanekar | H04L 63/0823 713/150 |
| 8,452,956 | B1* | 5/2013 | Kersey | H04L 63/0428 713/153 |
| 9,288,234 | B2* | 3/2016 | Barr | H04L 63/205 |
| 2002/0035681 | A1* | 3/2002 | Maturana | H04L 63/0428 713/151 |
| 2002/0199098 | A1* | 12/2002 | Davis | H04L 63/0281 713/160 |
| 2008/0126794 | A1* | 5/2008 | Wang | H04L 63/0464 713/151 |
| 2010/0017848 | A1* | 1/2010 | Pomerantz | H04L 63/20 726/2 |
| 2010/0325418 | A1* | 12/2010 | Kanekar | H04L 63/0823 713/151 |
| 2012/0272058 | A1* | 10/2012 | Wang | H04L 63/0464 713/156 |
| 2016/0119374 | A1* | 4/2016 | Williams | H04L 63/1441 713/175 |

* cited by examiner

*Primary Examiner* — Tae Kim
(74) *Attorney, Agent, or Firm* — Hamilton, DeSanctis & Cha LLP

(57) ABSTRACT

Systems and methods for inline security protocol inspection are provided. According to one embodiment, a security device receives an encrypted raw packet from a first network appliance and buffers the encrypted raw packet in a buffer. An inspection module accesses the encrypted raw packet from the buffer, decrypts the encrypted raw packet to produce a plain text and scans the plain text by the inspection module.

16 Claims, 7 Drawing Sheets

INLINE INSPECTION OF SECURITY PROTOCOLS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2013, Fortinet, Inc.

BACKGROUND

Field

Embodiments of the present invention generally relate to computer networking. In particular, various embodiments relate to inline inspection of security protocols, including, but not limited to Secure Socket Layer (SSL) and Transport Layer Security (TLS), by directly accessing raw data of a security protocol session by an inspection engine and transmitting the raw data in the same session with or without re-encryption.

Description of the Related Art

Many networking applications require secure and authenticated communications. SSL and its related protocols are often used to enable secure communications between a client and a server. According to SSL protocols, session information between an SSL client and an SSL server are negotiated through a handshake phase. The session information may include a session ID, peer certificates, the cipher specification to be used, the compression algorithm to be used, and shared secrets that are used to generate symmetric cryptographic keys. The SSL client encrypts a premaster secret with a public key from the SSL server's certificate and transmits the premaster secret to the server. Then, both parties compute the master secret locally and derive the session key from it. After the handshake phase, a secure socket is established, and application data encrypted by the session key can be securely transmitted between the client and server.

To inspect data that is encrypted in an SSL packet, a security policy enforcement device may perform SSL man-in-the-middle inspection as shown in FIG. 1. As shown in FIG. 1, a security policy enforcement device comprises a kernel 121, a transparent SSL proxy 122 and an inspection module 123. When SSL client 110 initiates an SSL session with SSL server 130 through network 140, a client hello message is transmitted by SSL client 110 though an SSL port, such as port 443. Transmission Control Protocol (TCP)/IP stack 121 intercepts the client hello message by monitoring the SSL port. Next, the client hello message is redirected to transparent SSL proxy 122. Transparent SSL proxy 122 uses its own certificate to negotiate with SSL client 110 to setup an SSL session 1. On the other hand, transparent SSL proxy 122 sends a client hello message to SSL server 130 and negotiates with SSL server 130 to setup an SSL session 2 over network 150. After the two SSL sessions are established, transparent SSL proxy 122 possesses a session key used for encrypting and decrypting data in SSL session 1 and another session key used for encrypting and decrypting data in SSL session 2. When SSL client 110 transmits data to SSL server 130, data transmitted by SSL client 110 is actually encrypted by the session key negotiated with transparent SSL proxy 122, not SSL server 130. After an encrypted packet that is transmitted from SSL client 110 in SSL session 1 is intercepted by kernel 121, the packet is redirected to transparent SSL proxy 122. Because transparent SSL proxy 122 possesses the session key of SSL session 1, it can decrypt the encrypted packet sent by SSL client 110. After the packet is decrypted, plain data of the packet is sent to inspection module 123 by kernel 121. The plain data is scanned by inspection module 123 according to inspection policies. If the plain data passes the scan, the data is re-encrypted by transparent SSL proxy 122 using a session key that is negotiated between transparent SSL proxy 122 and SSL server 130. A re-encrypted packet is then transmitted by kernel 121 to SSL server 130 through SSL session 2.

Because the SSL proxy uses plain sockets to do the network communication, it can be easily implemented. However, the problem is its poor efficiency. In the above example, transparent SSL proxy 122 is a full-function SSL proxy and is used for establishing the SSL connection and encrypting/decrypting SSL packets. The intrusion inspection module relies on the SSL proxy to decrypt the SSL packet before it can inspect the network traffic in plain text. After the inspection is done, SSL proxy 122 needs to re-encrypt the data and relays to peers. Thus, traffic needs to bounce back and forth between kernel space and user space applications.

Further, sockets are system wide resources and all networking applications in the same device may contend for such resources. The TCP/IP stack has to apply a regular resource management. The socket application programming interface (API) overhead causes further slow down in SSL traffic handling.

In a man-in-the-middle SSL inspection system as shown in FIG. 1, transparent SSL proxy 122 establishes SSL session 1 with SSL client 110 and establishes SSL session 2 with SSL server 130 independently and the two sessions are not matched. As shown in FIG. 1, transparent SSL proxy 122 negotiates with SSL client 110 and cipher suite 1, which is the most secure cipher suite that is supported by both of SSL client 110 and transparent SSL proxy 122, is used in the SSL session 1 between the two peers. Similarly, cipher suite 2 which is the most secure cipher that is supported by both of SSL server 130 and transparent SSL proxy 122 is selected. However, the negotiated cipher suites in the two sessions may not match because SSL client 110 and SSL server 130 may support different SSL suites.

Further, in a man-in-the-middle SSL inspection system as shown in FIG. 1, TCP flow would be altered from the beginning of the proxy involvement. For example, certificate 2 of SSL server 130 is received by transparent SSL proxy 122 in a server hello message sent by SSL server 130. However, transparent SSL proxy 122 sends certificate 1 of its own, instead of certificate 2 of SSL server 130, to SSL client 110. The certificates may have different sizes, for example, certificate 1 may have 1024 bits while certificate 2 may have 2048 bits. After the server hello messages are sent in the two sessions, TCP sequence number 1 in SSL session 1 may be 1024 bits smaller than TCP sequence number 2 in SSL session 2.

The transparent SSL proxy 122 maintains two distinct TCP connections for each SSL session, the TCP/IP stack 121 needs to do extra work to keep the traffic flowing, such as packet retransmission, fragmentation/defragmentation, TCP window scaling, etc.

SUMMARY

Systems and methods are described for inline security protocol inspection that can decrypt and inspect encrypted traffic based on raw Internet Protocol (IP) packets.

According to one embodiment, a security device receives an encrypted raw packet from a first network appliance and buffers the encrypted raw packet in a buffer. An inspection module accesses the encrypted raw packet from the buffer, decrypts the encrypted raw packet to produce a plain text and scans the plain text by the inspection module.

According to one embodiment, a security device receives handshake and encrypted packets from a first network appliance and directly communications with an inspection module, bypassing the TCP stack. The inspection module processes the packets, doing handshake and decryption, and inspects the plain text traffic for intrusion or policy enforcement. During this process, there is no involvement with the TCP stack and no socket API is used.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
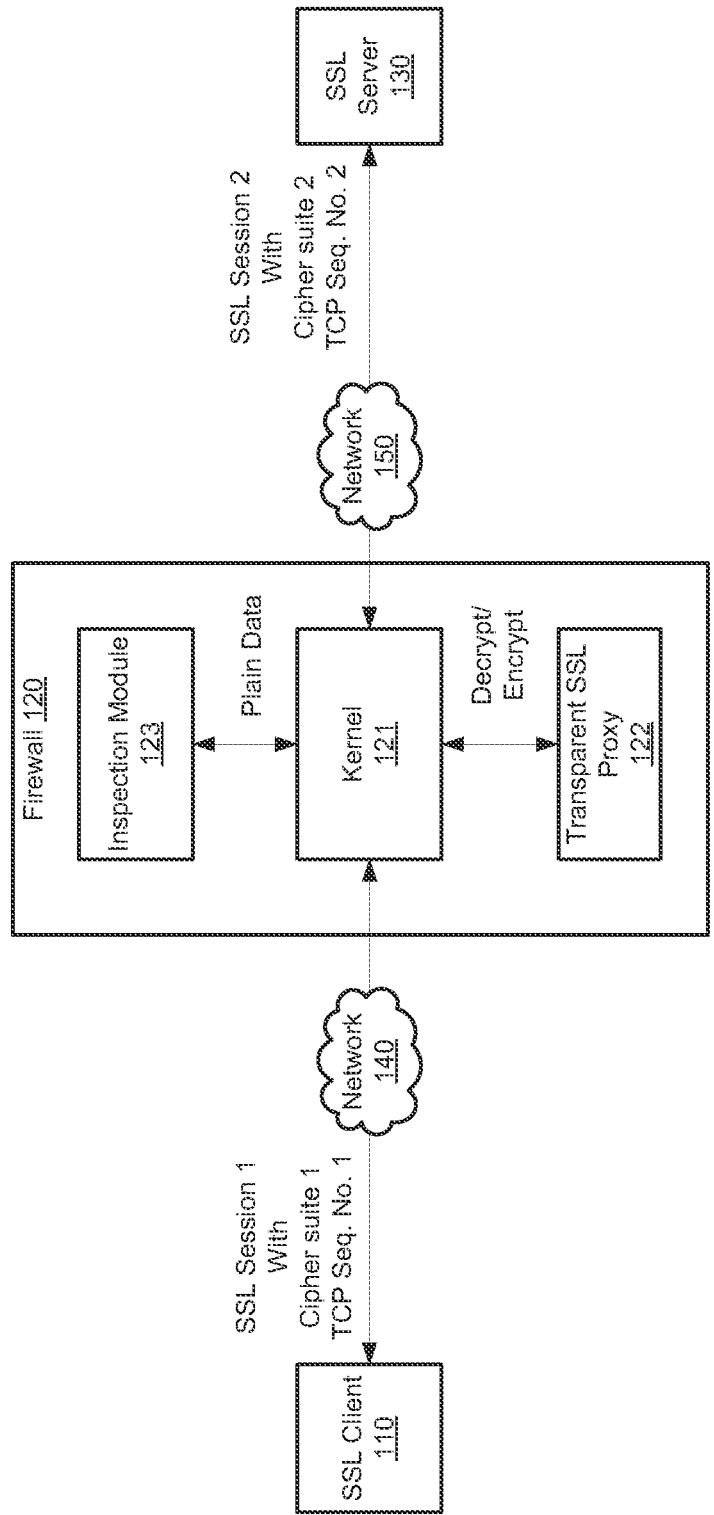
FIG. 1 conceptually illustrates a block diagram of a typical prior art SSL man-in-the-middle inspection system.

Systems and methods are described for inline security protocol inspection. As the amount of SSL traffic is increasing constantly on the Internet, it is important for a security device to decrypt and scan SSL packets efficiently when SSL traffic needs to be inspected. In currently existing SSL man-in-the-middle inspection devices, SSL packets bounce back and forth among a kernel, an SSL proxy and an inspection module. In order to improve the efficiency of SSL inspection, there is a need for methods and systems that facilitate faster SSL inspection without the overhead associated with traditional SSL man-in-the-middle inspection devices as described above.

According to one embodiment, an SSL packet need not be decrypted by an SSL proxy before it can be scanned by an inspection module. Instead, after an encrypted packet is received by a security device, it is provided to an inspection module directly. Then, the inspection module decrypts the encrypted packet and scans the decrypted data. Because the firewall does not need to transfer the SSL packet multiple times through sockets among a kernel, an SSL proxy and an inspection module, the inspection processing of an SSL packet is simplified and the efficiency is improved.

According to another embodiment, the inline inspection module need not change cipher suites listed in client hello messages. The inline inspection module may instead use the same cipher suites indicated in server hello messages. In this manner, cipher suite related data sizes are kept the same. The size of a certificate sent to the SSL client is tailored to be the same as the size of a certificate sent by the SSL server to the security device. As the sizes of certificates which are transmitted in the two sessions are the same, the TCP sequence numbers of the two sessions are maintained to be the same after the certificates are transmitted in the two sessions. Because cipher suites and TCP sequence numbers in the two sessions are tailored to be the same, the SSL packets in the two sessions are the same during the application data phase of the SSL session. The encrypted raw SSL packets received from the SSL client may be sent directly to the SSL server after the encrypted raw packet is scanned for key exchange algorithms which use single master key for symmetric key derivation.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

TERMINOLOGY

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phrases do not necessarily refer to the same embodiment.

If the specification states a component or feature "may", "can", "could", or "might" be included or have a characteristic, that particular component or feature is not required to be included or have the characteristic.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The phase "security device" generally refers to a hardware device or appliance configured to be coupled to a network and to provide one or more of data privacy, protection, encryption and security. The network security device can be a device providing one or more of the following features: network firewalling, VPN, antivirus, intrusion prevention (IPS), content filtering, data leak prevention, antispam, antispyware, logging, reputation-based protections, event correlation, network access control, vulnerability management, load balancing and traffic shaping—that can be deployed individually as a point solution or in various combinations as a unified threat management (UTM) solution. Non-limiting examples of network security devices include proxy servers, firewalls, VPN appliances, gateways, UTM appliances and the like.

The phase "security protocol" generally refers to a cryptographic protocol or encryption protocol that performs a security-related function and/or applies cryptographic methods. Security protocols are commonly used for secure application-level data transport. Examples of security protocols include, but are not limited to, SSL, TLS, Internet Key Exchange (IKE), IP Security (IPSec), Kerberos and Point-to-Point Protocol (PPP). The following documents are hereby incorporated by reference in their entirety for all purposes:

Request for Comments (RFC) 6101, entitled "The Secure Sockets Layer (SSL) Protocol Version 3.0" and dated August 2011;

RFC 5246, entitled "The Transport Layer Security (TLS) Protocol Version 1.2" and dated August 2008;

RFC 4306, entitled "Internet Key Exchange (IKEv2) Protocol" and dated December 2005;

RFC 6071, entitled "IP Security (IPsec) and Internet Key Exchange (IKE) Document Roadmap" and dated February 2011;

RFC 4120, entitled "The Kerberos Network Authentication Service (V5)" and dated July 2005; and RFC 1661, entitled "The Point-to-Point Protocol (PPP)" and dated July 1994.

Figure 2:
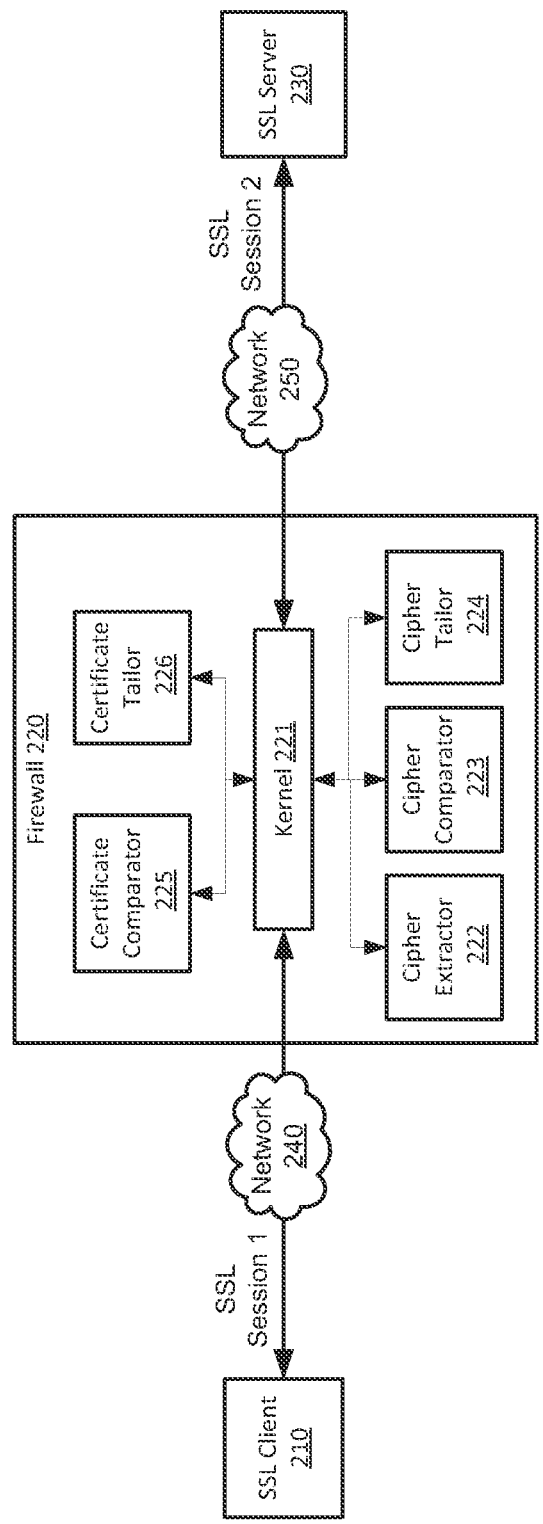
FIG. 2 illustrates exemplary handshake process units of an inline SSL inspection system in accordance with an embodiment of the present invention.

FIG. 2 illustrates exemplary handshake process units of an inline SSL inspection system in accordance with an embodiment of the present invention. An SSL session (e.g., SSL session 1 and SSL session 2) can be separated into two phases according to the SSL protocol. One phase is the handshake/key-exchange phase in which asymmetric cryptography is used to negotiate symmetric cryptographic keys. Depending on different key exchange algorithms, such as RSA, Diffie-Hellman (DH), Elliptic Curve DH (ECDH), session keys are generated on both the client and the server based on some random data and shared secrets. The other phase is the application data transmission phase in which application data encrypted by session keys are transmitted between the SSL client and SSL server. FIG. 2 illustrates process units of a security device (e.g., firewall 220) controlling the handshake phases of two SSL sessions between the security device and an SSL client 210 and an SSL server 230.

As shown in FIG. 2, SSL client 210 connects to firewall 220 via network 240 and SSL server 230 also connects to firewall 220 via network 250. In the context of the present example, SSL client 210 may be a network appliance that initiates an SSL connection with another peer. In one embodiment, SSL client 210 may be a personal computer (PC), a laptop or a mobile phone that is running a browser application (not shown). The browser may automatically initiate an SSL connection with a web server when a user is trying to access a web site via Hypertext Transfer Protocol Secure (HTTPS). HTTPS provides authentication of the web site and associated web server that one is communicating with and provides bidirectional encryption of communications between a client and server, which protects against eavesdropping and tampering with and/or forging the contents of the communication. In such an embodiment, SSL server 230 may be a web server that accepts HTTPS connections.

In another embodiment, SSL client 210 comprises an SSL Virtual Private Network (VPN) client and SSL server 230 comprises an SSL VPN gateway that provides support for remote user access to enterprise networks from anywhere on the Internet. Remote access may be provided through a secure VPN tunnel that is setup between the SSL VPN client and the SSL VPN gateway. After the tunnel is setup, the remote user can remotely access the resources of the internal network as if the remote user were within the network.

Since SSL works between the application layer and the network transport layer, many application layer protocols can be carried over SSL. Therefore, it should be appreciated that SSL client 210 may be other clients such as a File Transfer Protocol (FTP) client that supports FTP Secure (FTPS) or a mail client that supports Post Office Protocol 3 (POP3S)/Simple Mail Transfer Protocol secured with SSL (SMTPS), while SSL server 230 may comprise other servers, such as an FTP server that supports FTPS or a mail server that supports POP3S/SMTPS.

As shown in FIG. 2, firewall 220 may be any security device that connected between SSL client 210 and SSL server 230. Firewall 200 intercepts and scans SSL traffic between SSL client 210 and SSL server 230 using man-in-the-middle inspections.

According to one embodiment, firewall 220 not only includes routing and firewalling functionality, but can also include switching, modem, load balancing, gateways, wireless access point, threat management, hub and/or similar functionality in logical or physical form that provide, among other features, network access control and network security control.

Notably, networks 240 and 250 connecting SSL client 210, firewall 220 and SSL server 230 can be any type of internal or private network. Those skilled in the art will appreciate that networks 240 and 250 may be implemented as one of numerous types of networks, such as intranets, local area networks (LAN), wireless LANs (WLAN), virtual LANs (VLAN), or any combination of different types of networks. It will also be appreciated by those of ordinary skill in the art that networks 240 and 250 may also comprise or be part of the Internet.

In the embodiment as shown in FIG. 2, firewall 220 further comprises kernel 221, cipher extractor 222, cipher comparator 223, cipher tailor 224, certificate comparator 225 and certificate tailor 226. These units are used for controlling the handshake phase of SSL session 1 between SSL client 210 and firewall 220 and the handshake phase of SSL session 2 between SSL server 230 and firewall 220. The functions of these units will be described in further detail below.

When SSL client 210 wants to setup an SSL connection with SSL server 230, SSL client 210 sends a client hello message to SSL server 230.

The following is an example of a Client Hello message:
ClientVersion 3,1
ClientRandom[32]
SessionID: None (new session)
Suggested Cipher Suites:
SSL_RSA_WITH_NULL_MD5
SSL_RSA_WITH_NULL_SHA
SSL_RSA_EXPORT_WITH_RC4_40_MD5
SSL_RSA_WITH_RC4_128_MD5
SSL_RSA_WITH_RC4_128_SHA
SSL_RSA_EXPORT_WITH_RC2_CBC_40_MD5
SSL_RSA_WITH_IDEA_CBC_SHA
SSL_RSA_EXPORT_WITH_DES40_CBC_SHA
SSL_RSA_WITH_DES_CBC_SHA
SSL_RSA_WITH_3DES_EDE_CBC_SHA
Suggested Compression Algorithm: NONE Notably, suggested cipher suites listed in the client hello message are cipher suites that are supported by the SSL client. After the client hello message is received, an SSL server will select a cipher suite that is also supported by the SSL server and has the strongest security from the suggested cipher suites list. The selected cipher suite is then sent back to the SSL client and will be used during the SSL session. Additional details regarding the SSL handshake phase is described below.

Next, kernel 221 intercepts the client hello message sent from SSL client 210. This may be implemented by monitoring an SSL port, such as port 443.

Referring back to FIG. 1, which shows a currently existing man-in-the-middle inspection system, after a client hello message sent by SSL client 110 is intercepted by firewall 120, firewall 120 selects a cipher suite (cipher suite 1 as shown in FIG. 1) and sends a server hello message, including the selected cipher suite 1, back to SSL client 110. Meanwhile, firewall 120 sends another client hello message to SSL server 130. The client hello message sent by the firewall is independent from the client hello message sent by SSL client 110. Therefore, it is possible that SSL server 130 will select and return a cipher suite (cipher suite 2 as shown in FIG. 1) that is not the same as cipher suite 1 in a server hello message to firewall 120. After SSL session 1 (between the SSL client and the firewall) and SSL session 2 (between the SSL server and the firewall) are setup, SSL session 1 is encrypted based on cipher suite 1 and SSL session 2 is encrypted based on cipher suite 2. The encrypted packets in SSL session 1 cannot be transmitted directly in SSL session 2 because different encryptions are used. The encrypted packets in SSL session 1 will be decrypted for scanning by firewall 120 and re-encrypted in order to be sent in SSL session 2. The efficiency is lowered by such re-encryption.

In order to negotiate the same cipher suite between client firewall and server firewall, the firewall 220 may forward the client hello message sent by SSL client 210 to SSL server 230. However, the client hello message might be tailored so that unsupported cipher suites are excluded to avoid SSL server 230 picking a cipher suite that is not supported by firewall 220.

Therefore, in the present embodiment, cipher suites in the client hello message received by firewall 220 might be tailored before sending to SSL server 230 to ensure that SSL sessions can be setup using a cipher suite that is supported by firewall 220. In the present embodiment, cipher extractor 222 extracts the cipher suites that are included in the client hello message. In the example shown above, 10 cipher suites in the client hello message are extracted. The extracted cipher suites are compared with a list of cipher suites that are supported by firewall 220 at cipher comparator 223. If the extracted cipher suites are not in the list, unsupported cipher suites are removed from the client hello message by cipher tailor 224. After the cipher suites in the client hello message are tailored, the tailored client hello message is sent to SSL server 230 by kernel 221.

The following is an example of a Client Hello message after tailoring, in which only 4 cipher suites that supported by both SSL client 210 and firewall 220 are included:
  ClientVersion 3,1
  ClientRandom[32]
  SessionID: None (new session)
  Suggested Cipher Suites:
  SSL_RSA_WITH_NULL_MD5
  SSL_RSA_WITH_NULL_SHA
  SSL_RSA_EXPORT_WITH_RC4_40_MD5
  SSL_RSA_WITH_RC4_128_MD5

After the tailored client hello message is sent to SSL server 230, SSL server 230 selects a cipher suite from tailor client hello message and sends a server hello message back to firewall 220.

The following is an example of a Server Hello Message:
Version 3,1
ServerRandom[32]
SessionID:
bd608869f0c629767ea7e3ebf7a63bdcffb0ef58b1b941e6b0c044acb6820a77
Use Cipher Suite:
  SSL_RSA_WITH_NULL_MD5
Compression Algorithm: NONE Here, the cipher suite SSL_RSA_WITH_NULL_MD5 is selected by SSL server 230 and the selected cipher suite is supported by all of SSL client 210, firewall 220 and SSL server 230. The server hello message received by firewall 220 will be forwarded to SSL client 210. The cipher suite included in the server hello message will be used in the application data transmission phase in both SSL sessions 1 and 2.

Thereafter, a certificate of SSL server 230 is sent to firewall 220. The certificate of SSL server 230 is an electronic document that uses a digital signature to bind a public key with SSL server 230. The digital signature in a certificate can be used to verify that a public key belongs to SSL server 230. As should be appreciated, the certificate may be a hierarchical trust infrastructure such as an X.509-based Public Key Infrastructure (PKI) or a decentralized trust infrastructure such as Simple Public Key Infrastructure (SPKI). The structure of an X.509 v3 digital certificate is as follows:
Certificate
  Version
  Serial Number
  Algorithm ID
  Issuer
  Validity
    Not Before
    Not After
  Subject
  Subject Public Key Info
    Public Key Algorithm
    Subject Public Key
  Issuer Unique Identifier (optional)
  Subject Unique Identifier (optional)
  Extensions (optional)
    . . .
Certificate Signature Algorithm
Certificate Signature Referring back to FIG. 1, in currently existing man-in-the-middle inspection systems, after a certificate of SSL server 130 is received by firewall 120, firewall 120 sends its own certificate to SSL client 110 without considering the certificate of SSL server 130. Because items in certificates of SSL server 130 and firewall 120 may be different, the sizes of certificates may be different. For example, the size of the public key in the two certificates may be different as a result of the client and server having different security requirements. For example, public key of SSL server 130 may be 2048 bits while public key of firewall 120 may be 1024 bits. As such, in the context of a traditional man-in-the-middle inspection system, SSL session 1 and SSL session 2 are independently maintained by the kernel and packets transferred over the network might look totally different.

In embodiments of the present invention, the certificate of firewall 220 is selected or tailored before forwarding it to SSL client 210 so that the sizes of certificates of firewall 220 and SSL server 230 are the same. Therefore, the TCP sequence numbers in SSL session 1 will be the same as the TCP sequence numbers in SSL session 2 after the certificates are transmitted in the two sessions.

In one embodiment, firewall 220 may have multiple certificates provided by the manufacture. Firewall 220 may also allow users to upload certificates to firewall 220. These certificates may have different items and different public key sizes. Therefore, after the certificate of SSL server 230 is received by kernel 221, the certificate is sent to certificate comparator 225 to compare it with the certificates of firewall 220. Certificate comparator 225 matches the sizes of the certificate of SSL server 230 and certificates of firewall 220. If a certificate of firewall 220 has the same size of certificate of SSL server 230, then this certificate will be used as the base and information, such as subjects, are replaced with the ones from the server certificate. After modification, the new certificate is signed by the private key in firewall 220 and sent to SSL client 210. Thus far, the certificate size is same so that the TCP sequence number of SSL session 1 is kept the same as that of SSL session 2 after the certificates are transmitted in the two SSL sessions.

In another embodiment, if no certificate of firewall 220 is the same size as the certificate of SSL server 230, certificate tailor 226 will try to tailor one certificate of firewall 220 so that the size thereof will be matched. For example, if the certificate of firewall 220 is smaller than that of SSL server 230, some optional extensions whose size is exactly the difference between the two certificates may be incorporated into the certificate of firewall 220 so that the size is increased to the same as the size of certificate of SSL server 230. If the certificate of firewall 220 is bigger than that of SSL server 230, some optional extensions whose size is exactly the difference between the two certificates may be deleted from the certificate of firewall 220 so that the size is decreased to the same as the size of certificate of SSL server 230.

In a further embodiment, if it is impossible to increase or decrease the size of certificate of firewall 220 to match with the certificate of SSL server 230, the smaller certificate of firewall 220 may be selected and sent to SSL client 210. Then, some SSL records may be sent to SSL client so that the TCP sequence number in SSL session 1 is increased to match with the TCP sequence number of the SSL session 2. Further, if it the TCP sequence number of SSL session 1 cannot match that of SSL session 2 after the possible tailoring, then the difference between these two sessions may be recorded. The TCP sequence number of SSL session 1 will be amended before an encrypted packet is transmitted to SSL server in SSL session 2. This operation will be described in further detail below with reference to FIG. 4.

According to embodiments of the present invention, firewall 220 need not negotiate with SSL client 210 and SSL server 230 independently. Instead, firewall 220 tries to limit the cipher suites sent to SSL server 230 to those supported by both SSL client 210 and firewall 220. Firewall 220 also tries to use a certificate that has the same size as the certificate of SSL server 230. After the handshake phase, SSL session 1 and 2 should have the same cipher suite and TCP sequence numbers. If firewall 220 re-encrypts and creates a data packet for SSL session 2 as in the present existing system, the newly created data packet will be the same as the intercepted raw data packet because the cipher suite and TCP sequence number of SSL session 2 is the same as that of SSL session 1. In this manner, kernel 221 need not re-encrypt the decrypted data to create a new packet. Instead, the encrypted raw data packet intercepted in SSL session 1 can be directly sent to SSL server 330 in SSL session 2. In this scenario, if scanning is passed, the inspection module 323 may direct kernel 221 to send the data packet directly.

Figure 3:
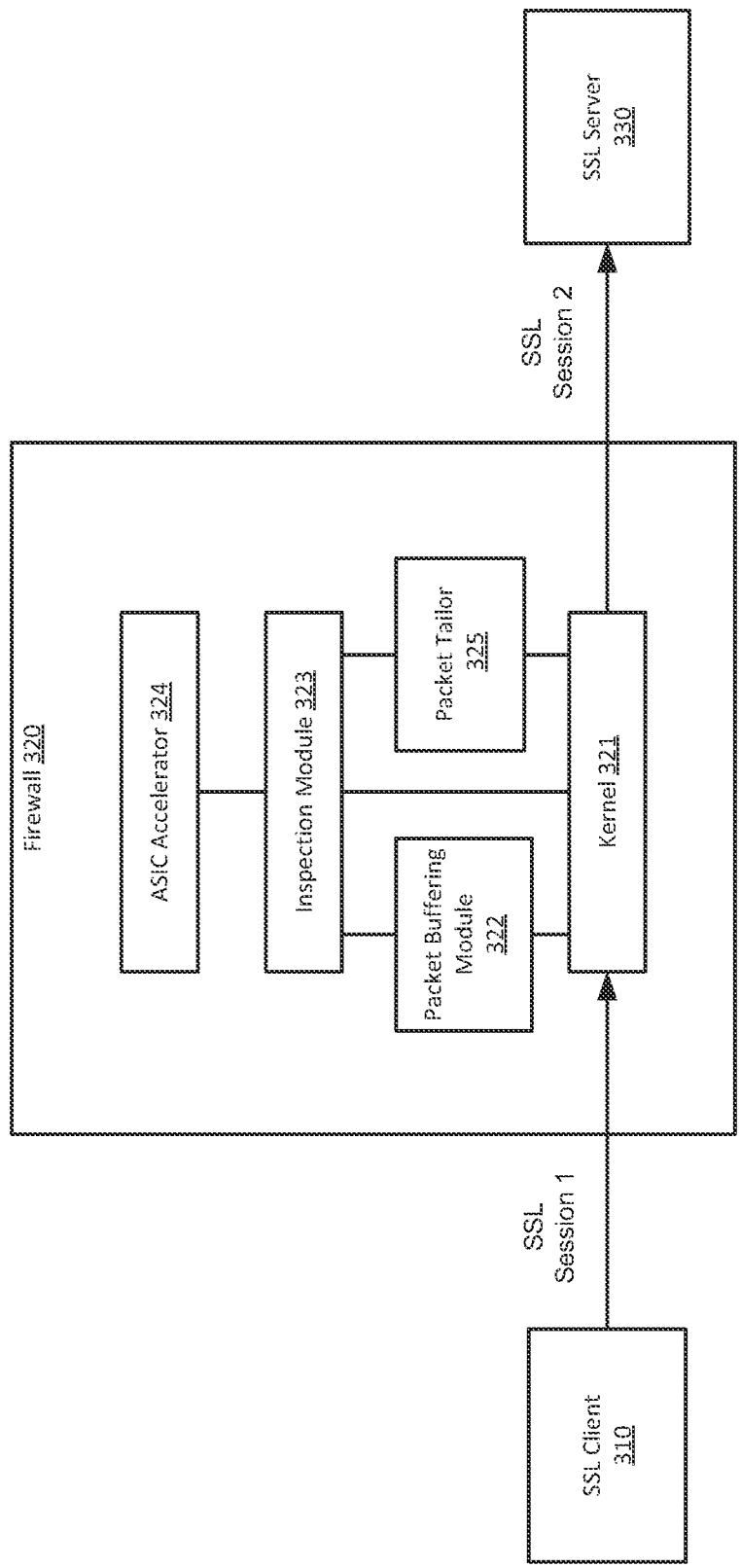
FIG. 3 illustrates exemplary application data process units of an inline SSL inspection system in accordance with an embodiment of the present invention.

FIG. 3 illustrates exemplary application data process units of an inline SSL inspection system in accordance with an embodiment of the present invention. In one embodiment of the present invention, firewall 320 comprises kernel 321, packet buffering module 322, inspection module 323, ASIC accelerator 324 and packet tailor 325.

During the application data phase of an SSL session, application data is encrypted by SSL client 310 using a session key. Encrypted data packets are sent by SSL client 310 in SSL session 1 and are intercepted by kernel 321. After an encrypted data packet is intercepted, kernel 321 saves the encrypted raw data into packet buffering module 322. It should be understood that packet buffering module 322 can use any data structure that is suitable for temporary packet storage. In one embodiment, packet buffering module 322 contains a memory mapped ring buffer which is suitable for buffering stream data.

After an encrypted raw packet is buffered, inspection module 323 accesses the encrypted raw packet from packet buffering module 322. In one embodiment, after an encrypted raw data is buffered, kernel 321 may direct inspection module 323 to access the encrypted raw data directly from packet buffering module 322 without sending the packet through a socket layer. In this manner, there is no packet buffer copy penalty in firewall 320 and the inspection efficiency is increased.

After receiving the encrypted raw data, inspection module 323 decrypts the encrypted raw data with the session key between SSL client 310 and firewall 320. Inspection module 323 directly decrypts the encrypted data without relying on an SSL proxy. Therefore, the packet does not bounce back and forth among the kernel, the SSL proxy and the inspection module and the efficiency of inspection is further improved.

In one embodiment, the decryption may be carried out by an Application-Specific Integrated Circuit (ASIC) accelerator 324 in order to accelerate the decryption speed. For ASIC acceleration, kernel 321 may save the SSL records in its memory and map the memory to user space so that ASIC accelerator 324 may directly access the SSL records. Then ASIC accelerator 324 may decrypt the encrypted data packet by its decryption engine. In this embodiment, the overhead of memory copying and context switching between user space and kernel space can be eliminated and the potential of ASIC acceleration engine can be fully utilized.

After the encrypted data is decrypted into plain data, inspection module 323 scans the plain data based on its inspection policies. If such policies don't allow the traffic, inspection module 323 directs kernel 321 to drop the encrypted data packet and reset the connection. If such policies allow the traffic, (i) the encrypted raw data packet, (ii) an amended raw data packet or (iii) a synthesized data packet may be sent to SSL server 330 through SSL session 2 depending on whether the cipher suites and TCP sequence numbers of the SSL sessions 1 and 2 are matched. Which data packet should be sent by kernel 321 to SSL server 330 through SSL session 2 is described in further detail below.

In a situation in which the cipher suites and TCP sequence numbers in sessions 1 and 2 are maintained to be the same after the handshake phase, data packets in session 1 and 2 are the same. Kernel 321 sends the encrypted raw data packet intercepted in SSL session 1 directly to SSL server 330 in SSL session 2. Kernel 321 need not re-encrypt the plain data to create a new packet.

In a situation in which the cipher suites or TCP sequence numbers in SSL session 1 and 2 cannot be tailored to be same in the handshake phase, encrypted raw data of SSL session 1 cannot be sent directly in SSL session 2. In this scenario, packet tailor 325 may amend the encrypted raw data before it is sent to SSL server 330. This will be described in further detail below with reference to FIG. 4.

Figure 4:
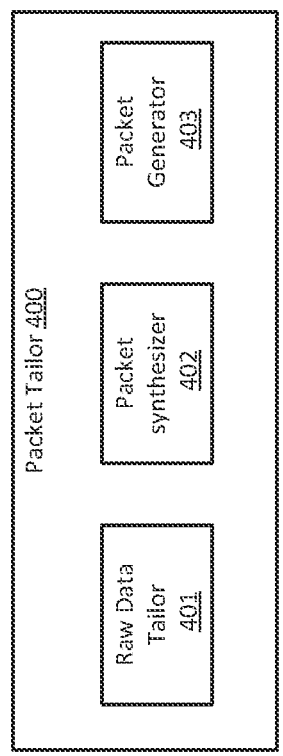
FIG. 4 illustrates exemplary process units of a packet tailor in accordance with an embodiment of the present invention.

FIG. 4 illustrates exemplary process units of a packet tailor in accordance with an embodiment of the present invention. In this embodiment, packet tailor 400 comprises raw data tailor 401, packet synthesizer 402 and packet generator 403.

In a situation in which cipher suites of SSL sessions 1 and 2 are the same while TCP sequence numbers in SSL sessions 1 and 2 are different, the difference between TCP sequence numbers of SSL sessions 1 and 2 may be recorded by raw data tailor 401 after the handshake phase. In another embodiment, raw data tailor 401 may keep track of the current TCP sequence numbers in SSL sessions 1 and 2. When encrypted raw data passes the scanning at inspection module but cannot be sent directly in SSL session 2 due to the different TCP sequence number, raw data tailor 401 may access the encrypted raw data in the buffering module and modify the TCP sequence number fields of the raw data packet. Then raw data tailor 401 may also recalculate and modify the checksums of the raw data packet. The resulting modified data packet is then sent directly to the SSL server by the kernel in SSL session 2.

In the above embodiment, packet tailor 400 modifies only the header of the raw data packet of SSL session 1 so that the modified data packet can be transmitted in SSL session 2. As the encrypted data portion of the raw data packet remains unchanged, it is much faster than re-encrypting plain data to form a new data packet for transmission in SSL session 2.

In some systems, the data packet in the TCP/IP stack is not allowed to be modified directly from outside of operating system as described above. In this case, a new data packet may be created by packet synthesizer 402. This will be described in further detail below.

As should be appreciated that data portions of the corresponding data packets in SSL sessions 1 and 2 are the same if the cipher suites in SSL sessions 1 and 2 are the same. If TCP sequence numbers in SSL sessions 1 and 2 are not matched, only the TCP headers of the corresponding data packets in the two sessions are different. Therefore, if the data packet in TCP/IP stack cannot be modified directly, then packet synthesizer 402 can create a TCP header using the TCP sequence number of SSL session 2 and a corresponding checksum. Then, the created TCP header is synthesized with the data portion of the encrypted data packet of SSL session 1 to form a new data packet for SSL session 2. Next, the kernel is redirected to the newly synthesized data packet and the synthesized data packet is sent to the SSL server in SSL session 2. Synthesizing a data packet by utilizing the existing encrypted data portion is also much faster than re-encrypting plain data to create a new packet because the time-consuming step of data re-encrypting is omitted.

In the case that the cipher suites in SSL sessions 1 and 2 are different, then packet generator 403 generate a new data packet by re-encrypting the plain data based on cipher suite of SSL session 2. Then the kernel is redirected to the newly generated data packet and sends it to the SSL server in SSL session 2.

Figure 5:
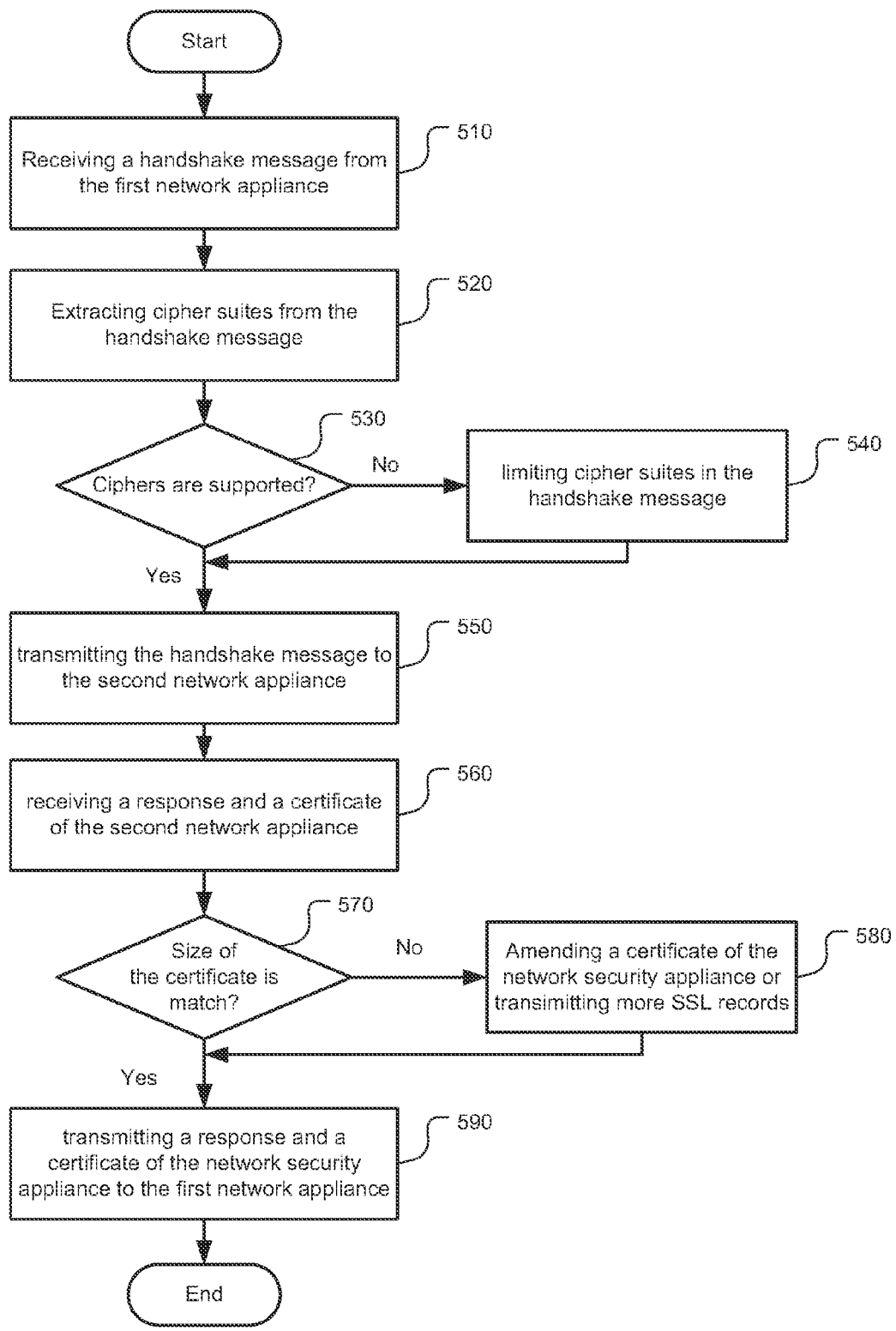
FIG. 5 illustrates a flow diagram for a handshake process in an inline SSL inspection system in accordance with an embodiment of the present invention.

FIG. 5 illustrates a flow diagram for a handshake process in an SSL man-in-the-middle inspection in accordance with an embodiment of the present invention. Depending upon the particular implementation, the various process and decision blocks described below may be performed by hardware components, embodied in machine-executable instructions, which may be used to cause a general-purpose or special-purpose processor programmed with the instructions to perform the steps, or the steps may be performed by a combination of hardware, software, firmware and/or involvement of human participation/interaction.

At block 510, a firewall intercepts a client hello message from an SSL client. The firewall can monitor the SSL port, such as port 443 for HTTPS protocol, to intercept the client hello message. The well known ports that are used by other protocol over SSL are as follows:
  Secure SMTP (SSMTP)—port 465
  Secure IMAP (IMAP4-SSL)—port 585
  IMAP4 over SSL (IMAPS)—port 993
  Secure POP3 (SSL-POP)—port 995

The firewall can monitor these ports to intercept client hello messages initiated in different protocols.

At block 520, a cipher suite extractor extracts the cipher suites that are listed in the client message. In the client hello message, there are a cipher suite length field and a cipher suite list field. The cipher suite extractor can access these two fields and extract cipher suites listed in the client hello message.

At block 530, a cipher suite comparator matches the extracted cipher suites with a list of cipher suites that are supported by the firewall. If any cipher suite extracted from the client hello message does not match, it means that the cipher suite of the SSL client is not supported by the firewall. Then, the unsupported cipher suite is deleted from the client message at block 540. After the unsupported cipher suite is cancelled, the cipher suites in the client hello message are limited to those supported by the firewall.

At block 550, the original or the amended client hello message is transmitted to an SSL server by the firewall.

At block 560, the firewall receives a server hello message from the SSL server. This is also implemented by monitoring corresponding SSL ports. The server hello message includes the cipher suite that is selected by the SSL server from the cipher suite list in the client hello message. The firewall also receives a certificate of the SSL server after receiving the server hello message.

At block 570, one or more certificates of the firewall are matched with the certificate of SSL server. If the size of the certificate of the firewall is the same as that of the SSL server, then a server hello message and the matched certificate of the firewall are sent to the SSL client by the firewall at block 590.

At block 580, if no certificate of the firewall is matched in size with the certificate of SSL server, one certificate of the firewall is amended by a certificate tailor so that the size of the amended certificate is the same as the size of the certificate of the SSL server. If the certificate of the firewall is smaller than that of the SSL server, some optional extensions whose size is exactly the difference between the two certificates may be incorporated into the certificate of the firewall. If the certificate of the firewall is bigger than that of the SSL server, some optional extensions whose size is exactly the difference between the two certificates may be deleted from the certificate of the firewall. The amended certificate of the firewall is then sent to the SSL client at block 590.

Further, if no certificate of the firewall can be amended to have the same size as the certificate of SSL server, more SSL records can be transmitted at the SSL session between the firewall and the SSL client or at the SSL session between the firewall and the SSL server so that the TCP sequence numbers of the two sessions are matched.

Figure 6:
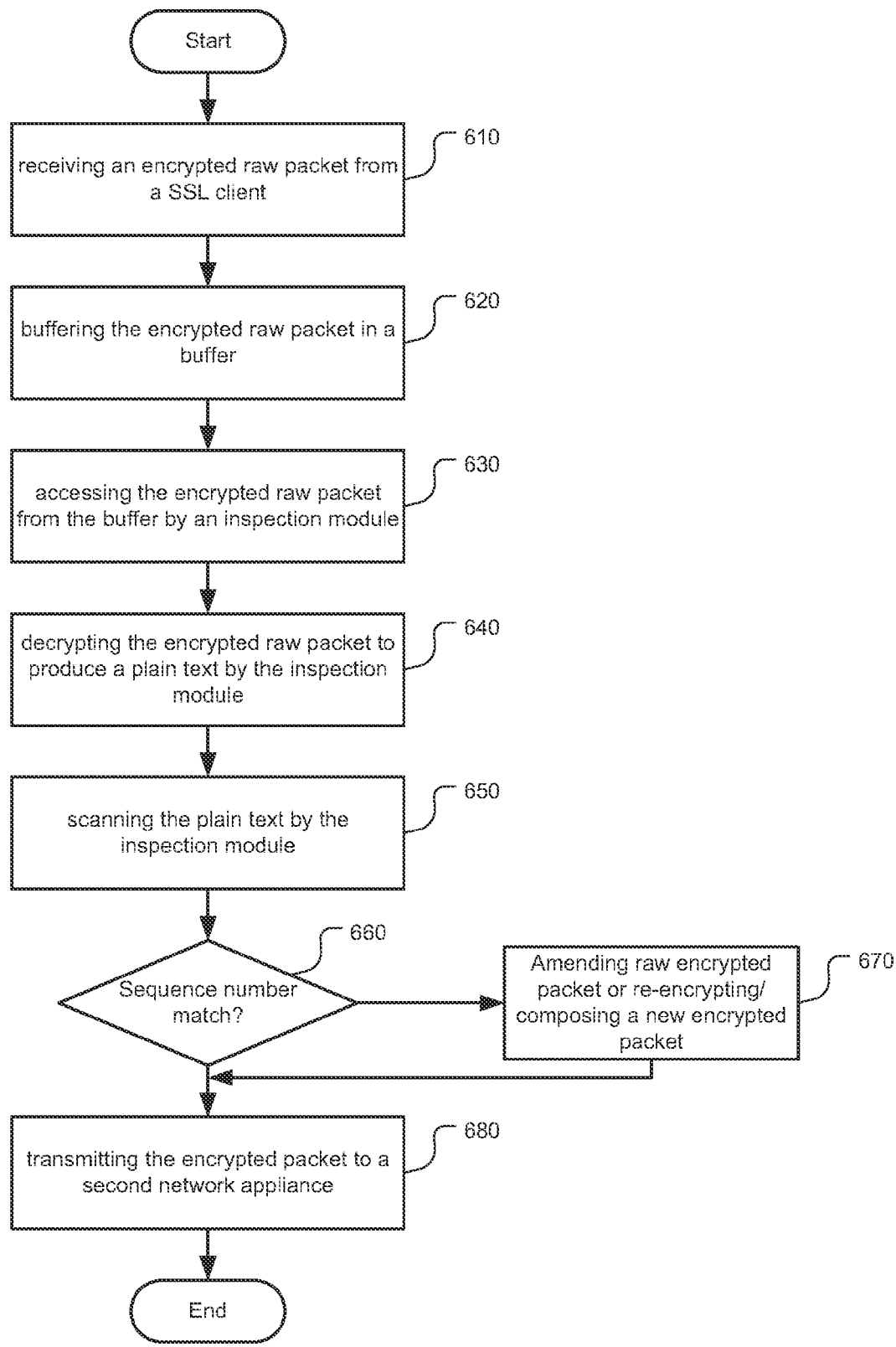
FIG. 6 illustrates a flow diagram for an application data process in an inline SSL inspection system in accordance with an embodiment of the present invention.

FIG. 6 illustrates a flow diagram for an application data process of an inline SSL inspection system in accordance with an embodiment of the present invention. In one embodiment, encrypted data packets received by the firewall are buffered. An inspection module of the firewall accesses the encrypted data packets from the buffer. Then, the inspection module decrypts and scans encrypted data packets directly without help of an SSL proxy for decryption so that the efficiency is improved.

First, at block 610, a kernel receives an encrypted raw packet from an SSL client. The encrypted raw packet is encrypted by a session key between the SSL client and the firewall.

At block 620, the encrypted raw packet is buffered by the kernel in a buffer. In an embodiment, the encrypted raw packet is buffered in a memory mapped ring buffer which is suitable for buffering stream data.

At block 630, an inspection module accesses the buffer to fetch the encrypted raw packet. It should be noted that the encrypted raw packet is not sent to the inspection module by the kernel through a socket. Instead, the inspection module may directly access the buffer so that the kernel does not need to apply typical resource management to use the "admin socket".

At block 640, the inspection module decrypts the encrypted raw packet to produce plain data using the session key between the SSL client and the firewall.

At block 650, the inspection module scans the plain data based on its inspection policies. If the scan fails, then the inspection module informs the kernel to drop the packet. If the scan passed, the procedure continues with block 660.

At block 660, a cipher suite and a TCP sequence number of SSL session 1 (between the SSL client and the firewall) and that of SSL session 2 (between the SSL server and the firewall) are compared. If the cipher suites and the TCP sequence numbers of SSL sessions 1 and 2 are the same, then the encrypted raw packet of SSL session 1 is transmitted directly to the SSL server in SSL session 2 at block 680.

If the cipher suites or the TCP sequence numbers of SSL sessions 1 and 2 are not the same, then the encrypted raw packet of SSL session 1 is amended or a new encrypted packet is composed at block 670. Here, if the cipher suites in SSL session 1 and 2 are the same while the TCP sequence numbers of SSL sessions 1 and 2 are not matched, then the TCP sequence number of the encrypted raw packet of SSL session 1 in the TCP/IP stack can be revised to the TCP sequence number of the SSL session 2. The checksum field of the raw packet of SSL session 1 can be re-calculated and revised if the TCP sequence number is amended. If the encrypted raw packet is not allowed to be amended in the TCP/IP stack, then a TCP packet header with the TCP sequence number of SSL session 2 can be created and the created TCP header and the data field of the encrypted raw packet of SSL session 1 can be synthesized together to form a composed encrypted packet. If the cipher suite of the SSL sessions 1 and 2 are not the same, then plain data decrypted from the encrypted raw packet of SSL session 1 can be re-encrypted to create a new encrypted packet for transmission in SSL session 2. The amended raw packet, the composed encrypted packet or the new encrypted packet is then transmitted at block 680.

While embodiments of the present invention are described above in connection with the SSL protocol, it is to be understood that similar security protocols that provide communication security over the Internet, such as TLS, IKE, IKEv2, IPSec, Kerberos, Point to Point Protocol and the like, may also be the subject of inline inspection consistent with the embodiments described herein. Similarly, security protocols that use asymmetric cryptography for authentication of key exchange and symmetric encryption for confidentiality may also be the subject of inline inspection in the manner described herein.

Figure 7:
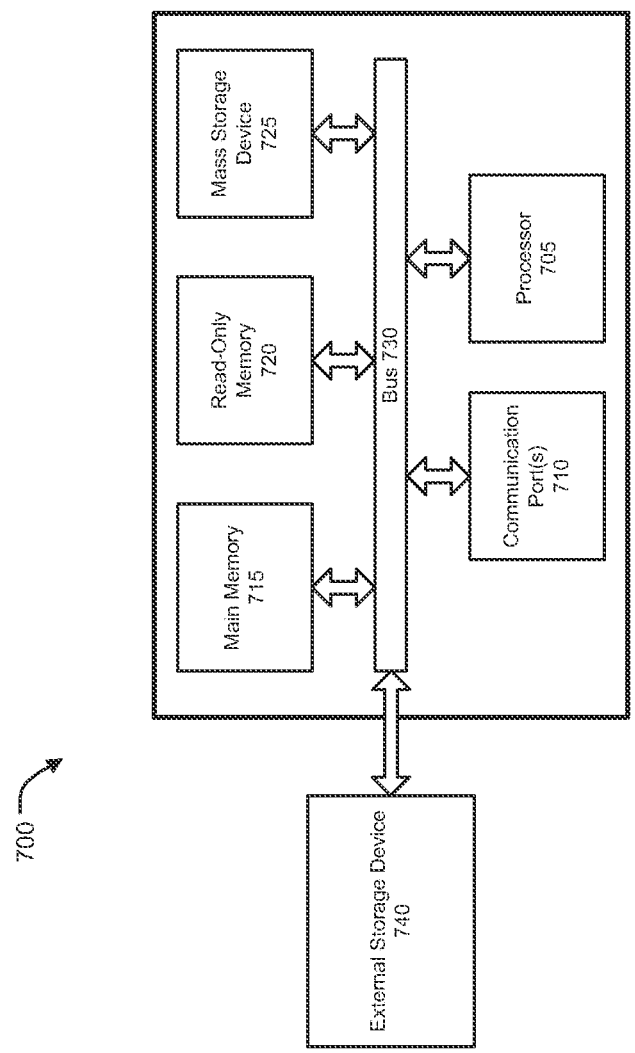
FIG. 7 illustrates an exemplary computer system in which or with which embodiments of the present invention may be utilized.

FIG. 7 is an example of a computer system 700 with which embodiments of the present disclosure may be utilized. Computer system 700 may represent or form a part of a network appliance (e.g., router/firewall 114 or switches 106a-b), a server or a client workstation.

Embodiments of the present disclosure include various steps, which will be described in more detail below. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 700 includes a bus 730, a processor 705, communication port 710, a main memory 715, a removable storage media 740, a read only memory 720 and a mass storage 725. A person skilled in the art will appreciate that computer system 700 may include more than one processor and communication ports.

Examples of processor 705 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 705 may include various modules associated with monitoring unit as described in FIG. 2.

Communication port 710 can be any of an RS-232 port for use with a modem based dialup connection, a 10/100 Ethernet port, a Gigabit or 10 Gigabit port using copper or fiber, a serial port, a parallel port, or other existing or future ports. Communication port 710 may be chosen depending on a network, such a Local Area Network (LAN), Wide Area Network (WAN), or any network to which computer system 700 connects.

Memory 715 can be Random Access Memory (RAM), or any other dynamic storage device commonly known in the art. Read only memory 720 can be any static storage device(s) such as, but not limited to, a Programmable Read Only Memory (PROM) chips for storing static information such as start-up or BIOS instructions for processor 705.

Mass storage 725 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 730 communicatively couples processor(s) 705 with the other memory, storage and communication blocks. Bus 730 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 705 to system memory.

Optionally, operator and administrative interfaces, such as a display, keyboard, and a cursor control device, may also be coupled to bus 730 to support direct operator interaction with computer system 700. Other operator and administrative interfaces can be provided through network connections connected through communication port 710.

Removable storage media 740 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method comprising:
   receiving, by a security device, a handshake message from a security protocol client;
   transmitting, by the security device, the handshake message to a security protocol server;
   receiving, by the security device, a response including a certificate of the security protocol server;
   transmitting, by the security device, a response including a certificate of the security device to the security protocol client;
   receiving, by the security device, an encrypted packet from the security protocol client, wherein application data contained in the encrypted packet is encrypted with a cipher suite deliberately caused to be selected for use in connection with both (i) a first security protocol session established between the security protocol client and the security device and (ii) a second security protocol session established between the security protocol server to which the encrypted packet is destined and the security device;
   buffering, by the security device, the encrypted packet in a buffer;
   accessing, by an inspection module of the security device, the encrypted packet from the buffer;
   decrypting the encrypted packet, by the inspection module, to produce a plain text version of the application data;
   scanning, by the inspection module, the plain text version of the application data;
   when a Transmission Control Protocol (TCP) sequence number of the first security protocol session is equivalent to a TCP sequence number of the second security protocol session, transmitting, by the security device, the encrypted packet to the security protocol server; and
   when a size of the certificate of the security device is smaller than a size of the certificate of the security protocol server, transmitting at least one more Secure Sockets Layer (SSL) record from the security device to the security protocol client so that the TCP sequence number of the first security protocol session is equivalent to the TCP sequence number of the second security protocol session.

2. The method of claim 1, further comprising:
   obtaining at least one cipher suite of the security protocol client from the handshake message by the security device;
   comparing the at least one cipher suite with cipher suites supported by the security device; and
   amending the handshake message by limiting the at least one cipher suite of the security protocol client to cipher suites supported by the security device.

3. The method of claim 1, wherein a size of the certificate of the security device and a size the certificate of the security protocol server are equivalent.

4. The method of claim 1, further comprising, when a size of the certificate of the security device is smaller than a size of the certificate of the security protocol server, incorporating at least one attribute of the security device into the certificate of the security device so that the size of the certificate of the security device is equivalent to the size of the certificate of the security protocol server.

5. The method of claim 1, further comprising when a size of the certificate of the security device is larger than the size of the certificate of the security protocol server, removing at least one attribute of the security device from the certificate of the security device so that the size of the certificate of the security device is equivalent to the size of the certificate of the security protocol server.

6. The method of claim 1, wherein said decrypting is implemented by an Application Specific Integrated Circuit (ASIC) acceleration engine of the security device.

7. The method of claim 1, wherein the buffer comprises a memory mapped ring buffer.

8. The method of claim 1, wherein said scanning, by the inspection module, the plain text version of the application data comprises performing one or more of antivirus scanning, intrusion detection scanning and intrusion prevention scanning.

9. A security device comprising
   one or more processors;
   a communication interface device;
   one or more internal data storage devices operatively coupled to the one or more processors and storing a receiving module, a buffer module and an inspection module, which when executed by the one or more processors perform a method comprising:
   receiving, by the receiving module, a handshake message from a security protocol client;
   transmitting, by the receiving module, the handshake message to a security protocol server;
   receiving, by the receiving module, a response including a certificate of the security protocol server;
   transmitting, by the security device, a response including a certificate of the security device to the security protocol client;
   receiving, by the receiving module, an encrypted packet from the security protocol client, wherein application data contained in the encrypted packet is encrypted with a cipher suite deliberately caused to be selected for use in connection with both (i) a first security protocol session established between the security protocol client and the security device and (ii) a second security protocol session established between the security protocol server to which the encrypted packet is destined and the security device;
   buffering the encrypted packet in a buffer of the buffer module;
   accessing, by the inspection module, the encrypted packet from the buffer;
   decrypting the encrypted packet, by the inspection module, to produce a plain text version of the application data;
   scanning, by the inspection module, the plain text version of the application data;
   when a Transmission Control Protocol (TCP) sequence number of the first security protocol session is equivalent to a TCP sequence number of the second security protocol session, transmitting, by the security device, the encrypted packet to the security protocol server; and
   when a size of the certificate of the security device is smaller than a size of the certificate of the security protocol server, transmitting at least one more Secure Sockets Layer (SSL) record from the security device to the security protocol client so that the TCP sequence number of the first security protocol session is equivalent to the TCP sequence number of the second security protocol session.

10. The security device of claim 9, wherein the method further comprises:
  obtaining at least one cipher suite of the security protocol client from the handshake message by the security device;
  comparing the at least one cipher suite with cipher suites supported by the security device; and
  amending the handshake message by limiting the at least one cipher suite of the security protocol client to cipher suites supported by the security device.

11. The security device of claim 9, wherein a size of the certificate of the security device and a size the certificate of the security protocol server are equivalent.

12. The security device of claim 9, wherein the method further comprises when a size of the certificate of the security device is smaller than a size of the certificate of the security protocol server, incorporating at least one attribute of the security device into the certificate of the security device so that the size of the certificate of the security device is equivalent to the size of the certificate of the security protocol server.

13. The security device of claim 9, wherein the method further comprises when a size of the certificate of the security device is larger than the size of the certificate of the security protocol server, removing at least one attribute of the security device from the certificate of the security device so that the size of the certificate of the security device is equivalent to the size of the certificate of the security protocol server.

14. The security device of claim 9, further comprising an Application Specific Integrated Circuit (ASIC) acceleration engine and wherein said decrypting is implemented by the ASIC acceleration engine.

15. The security device of claim 9, wherein the buffer comprises a memory mapped ring buffer.

16. The security device of claim 9, wherein the security device comprises an intrusion prevention system (IPS) or a unified threat management (UTM) appliance and wherein said scanning, by the inspection module, the plain text version of the application data comprises performing one or more of antivirus scanning, intrusion detection scanning and intrusion prevention scanning.

\* \* \* \* \*